US010750902B2

(12) United States Patent
Hanneken

(10) Patent No.: US 10,750,902 B2
(45) Date of Patent: Aug. 25, 2020

(54) WARMING APPARATUS FOR WARMING THE CONTENTS OF A FOODSTUFF CONTAINER

(71) Applicant: Handi-Craft Company, St. Louis, MO (US)

(72) Inventor: Douglas Hanneken, Saint Louis, MO (US)

(73) Assignee: Handi-Craft Company, St. Louis, MO (US)

( * ) Notice: Subject to any disclaimer, the term of this patent is extended or adjusted under 35 U.S.C. 154(b) by 267 days.

(21) Appl. No.: 15/852,873

(22) Filed: Dec. 22, 2017

(65) Prior Publication Data

US 2018/0192819 A1    Jul. 12, 2018

Related U.S. Application Data

(60) Provisional application No. 62/443,204, filed on Jan. 6, 2017.

(51) Int. Cl.
*A47J 36/24* (2006.01)

(52) U.S. Cl.
CPC ................................ *A47J 36/2438* (2013.01)

(58) Field of Classification Search
CPC .................................................. A47J 36/2483; A47J 36/2411; A47J 36/2416; A47J 36/2444; A47J 36/36
USPC ................ 219/433–439, 549, 385–388, 390; 165/46, 80.5
See application file for complete search history.

(56) References Cited

U.S. PATENT DOCUMENTS

| 2,595,685 A | 5/1952 | Mallory |
| 5,544,701 A * | 8/1996 | Elder ...................... E03C 1/041 126/261 |
| 5,975,337 A | 11/1999 | Hadley |
| 6,571,564 B2 | 6/2003 | Upadhye et al. |

(Continued)

FOREIGN PATENT DOCUMENTS

| CN | 101438934 | * | 5/2009 |
| EP | 180375 A1 | | 5/1986 |
| WO | 2006040571 A1 | | 4/2006 |

OTHER PUBLICATIONS

PCT International Search Report and Written Opinion for PCT Application PCT/US2017/068080 received Mar. 20, 2018; 10 pp.

(Continued)

*Primary Examiner* — Lien M Ngo
(74) *Attorney, Agent, or Firm* — Armstrong Teasdale

(57) ABSTRACT

In a warming apparatus for warming the contents of a foodstuff container, a barrier member is disposed at least in part within the interior space of a housing of the apparatus and includes a generally tubular barrier wall extending longitudinally within the housing and defining a warming compartment therein. The barrier wall has a lower end and an open upper end accessible through an open upper end of the housing for receiving the foodstuff container into the warming compartment. The barrier wall is resiliently flexible at least transversely of the barrier member. A reservoir is disposed in the housing for containing a warming liquid. A heating unit is in fluid communication with the reservoir. The heating unit is operable to receive warming liquid from the reservoir and heat the warming liquid for supplying heated warming liquid into the warming compartment to warm the contents of the foodstuff container.

20 Claims, 6 Drawing Sheets

(56) References Cited

U.S. PATENT DOCUMENTS

| | | | |
|---|---|---|---|
| 6,703,590 B1 | 3/2004 | Holley, Jr. | |
| 6,906,289 B2* | 6/2005 | Serres Vives | A47J 36/2438 |
| | | | 219/386 |
| 7,910,860 B2* | 3/2011 | Irvin | A45D 34/00 |
| | | | 219/201 |
| 8,759,722 B2 | 6/2014 | Bolbanat | |
| 8,796,591 B2 | 8/2014 | Schwartz | |
| 8,866,050 B2 | 10/2014 | McBean et al. | |
| 2004/0140304 A1 | 7/2004 | Leyendecker | |
| 2006/0207745 A1* | 9/2006 | Koda | F17C 11/005 |
| | | | 165/46 |
| 2012/0061376 A1* | 3/2012 | McBean | A47J 36/2438 |
| | | | 219/430 |
| 2014/0069606 A1 | 3/2014 | Lee et al. | |
| 2016/0242598 A1 | 8/2016 | Alexander | |

OTHER PUBLICATIONS

PCT International Preliminary Report on Patentability for PCT Application PCT/US2017/068080 dated Jul. 18, 2019; 8 pp.

* cited by examiner

WARMING APPARATUS FOR WARMING THE CONTENTS OF A FOODSTUFF CONTAINER

CROSS-REFERENCE TO RELATED APPLICATION

This patent application claims priority to U.S. Provisional Patent Application Ser. No. 62/443,204 filed Jan. 6, 2017, which is hereby incorporated by reference in its entirety.

FIELD

The field of the disclosure relates generally to warming apparatus for warming the contents of a foodstuff container, and more particularly to such a warming apparatus for warming the contents of containers, such as bottles, jars, flexible bags and the like, used for containing baby foodstuffs such as breastmilk, nursing formula or baby food.

BACKGROUND

Containers for baby foodstuffs such as breastmilk, nursing formula, other liquid foodstuffs or baby foods come in various materials, sizes and shapes. For example, breastmilk and nursing formula containers are typically in the form of what is commonly referred to as a baby bottle which may be made of a relatively rigid plastic or glass. However, flexible plastic pouches or bags that can be used for freezer storage of breastmilk and nursing formula may also be used as containers for baby foodstuffs. Of course, baby foods (e.g., semi-solids, pastes, gels, purees, solids, etc.) that are typically served using a spoon are typically contained in jars but may also be contained in flexible tubes or other squeeze-type dispensing containers.

Conventional warming apparatus typically include a housing having a warming compartment into which the container (with the foodstuff therein) is placed for warming. In one type of apparatus, referred to as a bath-type warming apparatus, the warming compartment is filled with a warming liquid such as water. The foodstuff container, upon placement in the warming compartment is partially immersed in the warming liquid. The warming liquid is heated to heat the foodstuff within the container. In other known warming apparatus, such as that disclosed in U.S. Pat. No. 6,906,289 issued Jun. 14, 2005 and entitled Apparatus for Heating a Vessel Containing Foodstuffs, heated warming liquid is directed to an upper end of the warming compartment and dispensed onto the foodstuff container so that the heated liquid flows down over the container within the warming compartment. The warming then drains down into a reservoir below the warming compartment for reheating and delivery back to the upper end of the warming compartment.

In another known warming apparatus, disclosed in U.S. Pat. No. 8,866,050 issued Oct. 21, 2014 and entitled Baby Bottle Warmer and Method of Using Same, heated warming liquid is pumped into the warming compartment at the lower end of the warming compartment and the level of warming liquid in the warming compartment to fill the warming compartment with heated warming liquid. When warming of the foodstuff in the container is completed (e.g., to a desired temperature), the warming liquid drains out of the warming compartment into the reservoir so that the foodstuff container does not remain immersed in heated liquid once the desired foodstuff temperature is reached.

In still other known warming apparatus, steamed warming liquid is delivered into the warming compartment to warm the foodstuff in the container.

One drawback common to these conventional warming apparatus is that the warming compartment must be sized—particularly in transverse cross-section such as width or diameter—to accommodate foodstuff containers of various types and sizes. As a result, for bath-type warming apparatus such as that disclosed in U.S. Pat. No. 8,866,050 a relatively large amount of warming liquid is needed to fill the warming compartment even if the foodstuff container is substantially smaller than the warming compartment. Additionally, foodstuff containers that are flexible, such as a pouch or bag, are inadequately supported within the warming compartment and may tilt, fold or to otherwise reconfigure into a shape which results in uneven warming of the foodstuff within the container.

There is a need, therefore, for such a warming apparatus that is more adequately supportive of foodstuff containers of various types and sizes and efficiently warms the foodstuff within the container.

SUMMARY

In one aspect, warming apparatus for warming the contents of a foodstuff container generally comprises a housing having a peripheral sidewall defining an interior space of the apparatus. The housing has an open upper end. A barrier member is disposed at least in part within the interior space of the housing, with the barrier member generally comprising a generally tubular barrier wall extending longitudinally within the housing and defining a warming compartment therein. The barrier wall has a lower end and an open upper end accessible through the open upper end of the housing for receiving the foodstuff container into the warming compartment. The barrier wall is resiliently flexible at least transversely of the barrier member. A reservoir is disposed in the housing for containing a warming liquid. A heating unit is in fluid communication with the reservoir. The heating unit is operable to receive warming liquid from the reservoir and heat the warming liquid for supplying heated warming liquid into the warming compartment to warm the contents of the foodstuff container.

In another aspect, warming apparatus for warming the contents of a foodstuff container generally comprises a housing having a peripheral sidewall defining an interior space of the apparatus. The housing has an open upper end. A barrier member is disposed at least in part within the interior space of the housing. The barrier member comprises a generally tubular barrier wall extending longitudinally within the housing and defining a warming compartment therein. The barrier wall has a lower end and an open upper end accessible through the open upper end of the housing for receiving the foodstuff container into the warming compartment. The barrier wall is constructed of a resiliently flexible material and adapted to engage the foodstuff container when the foodstuff container is disposed in the apparatus. A reservoir is disposed in the housing for containing a warming liquid. A heating unit is in fluid communication with the reservoir. The heating unit is operable to receive warming liquid from the reservoir and heat the warming liquid for supplying heated warming liquid into the warming compartment to warm the contents of the foodstuff container.

In yet another aspect, a barrier member for use in a warming apparatus for warming the contents of a foodstuff container generally comprises a tubular barrier wall extending longitudinally within housing interior and defining a warming compartment therein. The barrier wall has a lower end and an open upper end accessible through an open upper end of the housing for receiving the foodstuff container into the warming compartment. The barrier wall is resiliently flexible at least transversely of the barrier member. The barrier wall has an inner surface defining the warming compartment, and a plurality of channels extending longitudinally in the inner surface from the lower end to the upper end of the barrier wall. A sealing gasket extends transversely outward from the lower end of the barrier wall. A containment bowl extends generally transversely outward and upward from the upper end of the barrier wall in a generally bowl-shaped configuration.

BRIEF DESCRIPTION OF THE DRAWINGS

These and other features, aspects, and advantages of the present disclosure will become better understood when the following detailed description is read with reference to the accompanying drawings in which corresponding characters represent corresponding parts throughout the several views of the drawings.

DETAILED DESCRIPTION OF THE DRAWINGS

FIGS. 1-4 illustrate a first embodiment of a warming apparatus, generally indicated at 101, for warming the contents of a foodstuff container. As used herein, the term container refers to any container suitable for containing foodstuff. In particular embodiments, the container is suitable for dispensing the foodstuff from the container by pouring, drinking, squeezing, scooping, spooning or other suitable dispensing technique. The container may be, for example and without limitation, a bottle, jar, a can, a flexible pouch or bag, a squeeze tube or other suitable container used to contain foodstuff. The container may be made of substantially any material but is most suitably constructed of a material that allows efficient heat transfer between the foodstuff contained in the container and a warming liquid exterior of the container. For example, and without limitation, glass, plastic, metal or combinations thereof are suitable materials from which the container may be constructed.

The term foodstuff as used herein refers to any foodstuff, whether in liquid, semi-solid or solid form. In the illustrated embodiments herein, the warming apparatus 101 is in the form of a warming apparatus for warming baby foodstuffs such as breastmilk, nursing formula or baby food. In the various embodiments herein, the container is in the form of a baby bottle B used for liquid foodstuffs such as breastmilk or nursing formula.

Figure 1:
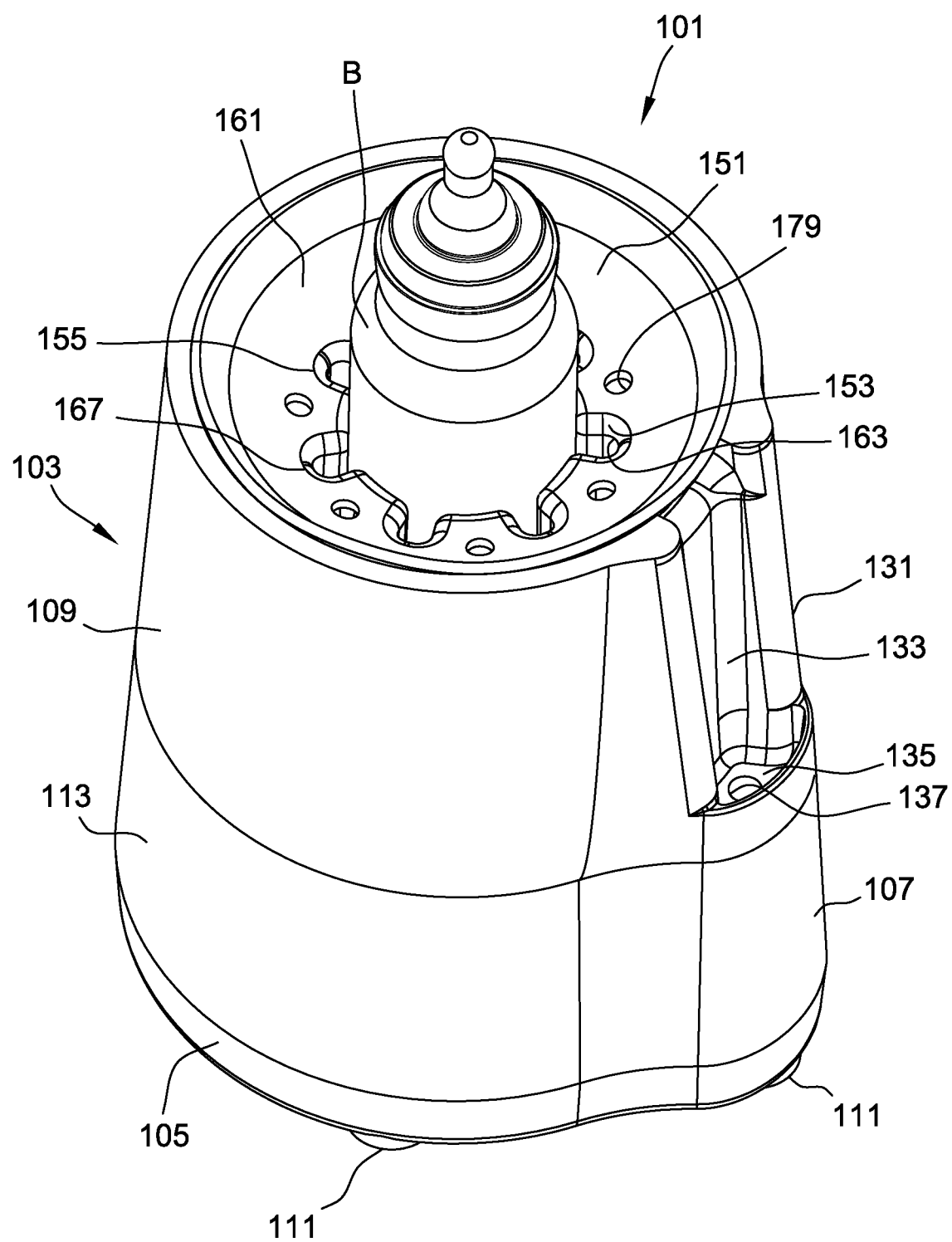
FIG. 1 is a perspective view of one embodiment of a warming apparatus for warming the contents of a foodstuff container, with a foodstuff container in the form of a baby bottle to be warmed disposed in a warming compartment of the apparatus.

With particular reference to FIG. 1, the warming apparatus 101 generally comprises a housing, indicated at 103, defined by a base 105, a lower housing 107 and an upper housing 109. The lower housing 107 may be formed integrally with the base 105 or formed separate from the base 105 and attached thereto by adhesive bonding, thermal bonding, mechanical fastening or other suitable attachment techniques. The upper housing 109 may formed integrally with the lower housing 107, or formed separate from the lower housing and attached thereto by a suitable attachment technique. In other embodiments, the upper housing 109 may be releasably removable from the lower housing 107, such as for cleaning or maintenance purposes.

Figure 3:
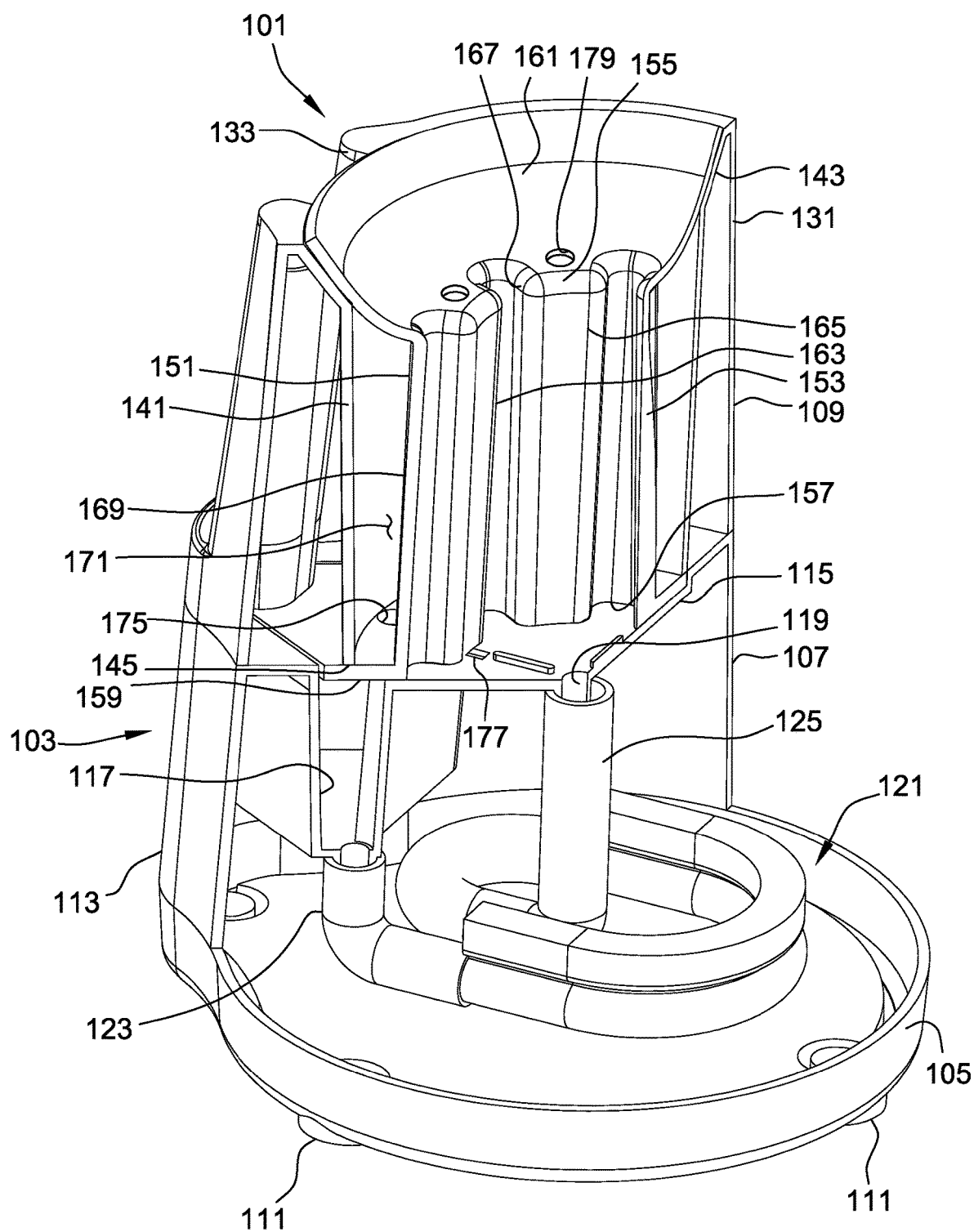
FIG. 3 is another perspective view of the apparatus of FIG. 1 with portions of the apparatus removed or sectioned to reveal internal construction.
Figure 4:
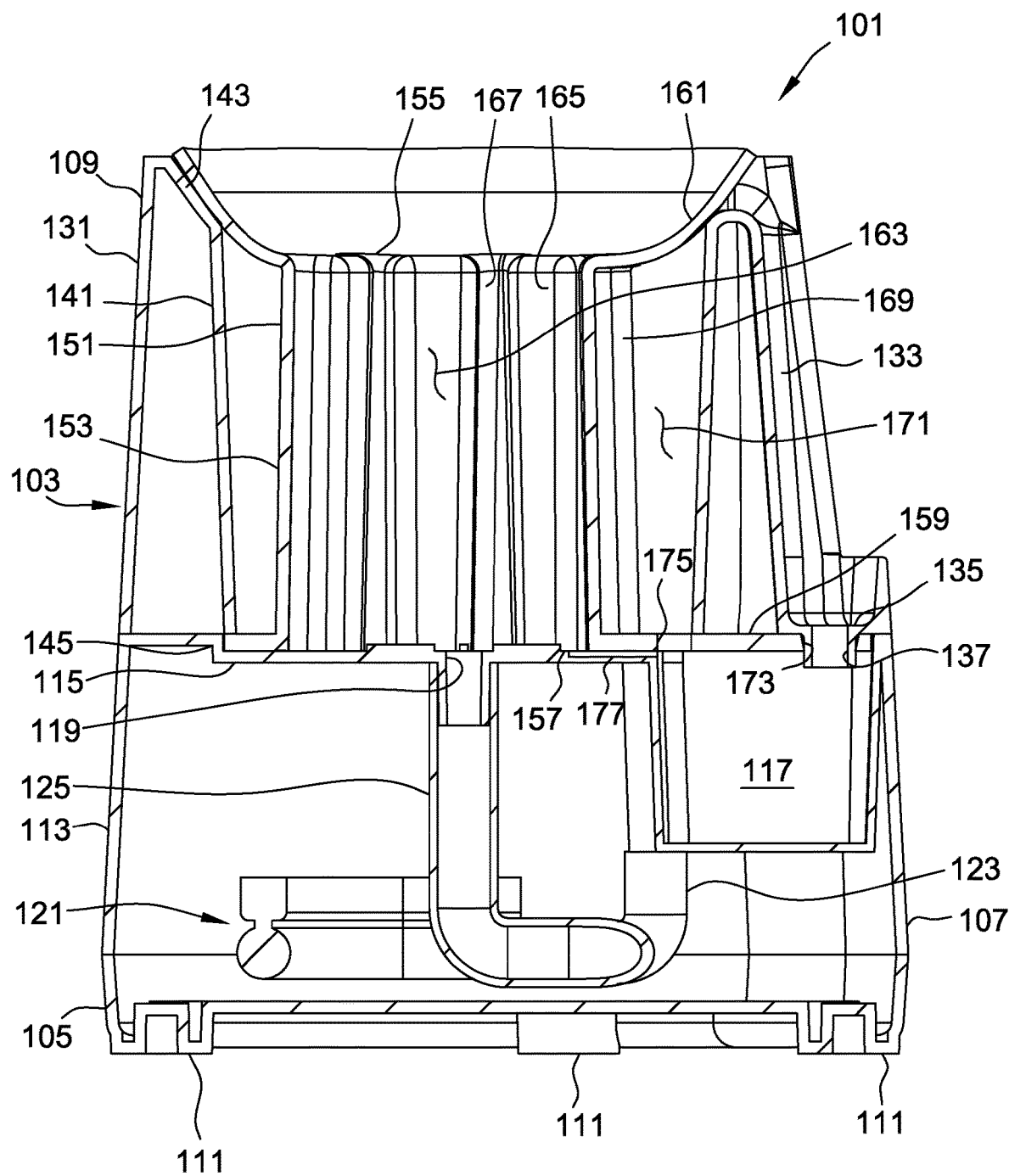
FIG. 4 is a cross-section of the warming apparatus FIG. 1.

As seen best in FIGS. 3 and 4, the base 105 includes a plurality of feet 111 for supporting the apparatus 101 on a surface. The lower housing 107 comprises an outer peripheral sidewall 113 extending up from the base 105. A support plate 115 is formed integrally with the outer peripheral sidewall 113 at an upper end of the sidewall and extends transversely thereof across the lower housing 107 to substantially enclose an interior space of the lower housing. A reservoir 117 is formed integrally with and depends from the support plate 115 for containing warming liquid to be used in warming the contents of the foodstuff container B in the manner described later herein. It is understood that in other embodiments the support plate 115 may instead be formed integrally with the lower end of the upper housing 109, or it may be formed separate from the upper and lower housings and retained in place upon assembly with the upper and lower housings. The support plate 115 includes a central inlet opening 119 through which warming liquid flows from the lower housing 107 into the upper housing 109.

A suitable heating unit 121 is disposed in the interior space of the lower housing 107 but otherwise exterior of the reservoir 117. In the illustrated embodiment the heating unit 121 is suitably a thermal heat pump, the construction and operation of which is known to those of ordinary skill in the art. A similar type thermal heat pump is disclosed in U.S. Pat. No. 6,906,289 issued Jun. 14, 2005 and entitled Apparatus for Heating a Vessel Containing Foodstuffs. In particular, a delivery conduit 123 extends from the reservoir 117 to the heating unit 121 for delivering warming liquid from the reservoir to the heating unit. In the illustrated embodiment, the delivery is by gravity feed from the reservoir 117 to the heating unit 121. A one-way check valve (not shown) is disposed in the delivery conduit 123 to inhibit the backflow of warming liquid from the heating unit 121 into the reservoir. A generally vertically extending outlet conduit 125 extends up from the heating unit 121 to the central inlet opening 119 of the support plate 115. In operation, the heating unit 121 rapidly heats the warming liquid delivered thereto from the reservoir 117, bringing it to a boil such that vapor pressure resulting from the boiling warming liquid causes a rise of heated warming liquid up through the outlet conduit 125 and into the upper housing 109 via the inlet opening 119 in the support plate 115.

Because the heated warming liquid is delivered into the upper housing 109 at the bottom of the upper housing, the outlet conduit 125 leading from the heating unit 121 is relatively short and the heated warming liquid is delivered into a pool of already heated warming liquid in the upper housing 109. As a result, the intermittent gurgling or spurting sounds that are commonly heard in coffee-makers or other similar water heating systems in which the heated liquid is pushed upward through a relatively longer conduit and expelled therefrom to drip downward from the conduit are not experienced with the present apparatus 101.

The upper housing 109 has an outer peripheral sidewall 131 that seats on the upper end of the lower housing 107 with the support plate 115 at least in part generally separating the upper and lower housings. As seen best in FIG. 1, a portion 133 of the outer peripheral sidewall 131 of the upper housing 109 is indented along the height of the upper housing at a location disposed above the reservoir 117 of the support plate 115 to generally define a fill tray 135 accessible exterior of the upper housing. A fill opening 137 is formed in the bottom of the fill tray 135, i.e., above the reservoir 117, to allow filling (or emptying) of the reservoir with warming liquid.

In the illustrated embodiment (as seen best in FIGS. 2-4), an inner peripheral sidewall 141 is disposed within the interior space of the upper housing 109 in transversely spaced relationship with the outer peripheral sidewall 131. The inner and outer peripheral sidewalls 141, 131 are connected by a suitable connecting panel 143 at respective upper ends of the inner and outer peripheral sidewalls. For example, in one particularly suitable embodiment the inner and outer peripheral sidewalls 141, 131 and the connecting panel 143 are formed integrally as a single piece. It is understood, however, that the inner and outer peripheral sidewalls 141, 131 of the upper housing 109 may be formed separate from each other and attached by a suitable connecting panel 143 or other connecting structure. It is also contemplated that in other embodiments the inner and outer peripheral sidewalls 141, 131 may not be connected to each other—directly or indirectly—and remain within the scope of this disclosure.

A barrier member 151 is also disposed within the upper housing 109 and comprises a generally cylindrical barrier wall 153 having an open upper end 155 and a lower end 157, a sealing gasket 159 extending transversely outward from the lower end of the barrier wall and a containment bowl 161 extending generally transversely outward and upward from the upper end of the barrier wall in a generally bowl-shaped configuration. The barrier wall 153 defines a warming compartment 163 in which the baby bottle B (i.e., the foodstuff container) is received for warming by the apparatus 101. More particularly, the warming compartment 163 is defined by an inner surface 165 of the barrier wall 153. The warming compartment 163 is sized in transverse cross-section (e.g., in width or diameter) substantially similar to or smaller than the transverse cross-sectional dimension of conventional foodstuff containers so that upon insertion of the foodstuff container into the warming compartment the barrier wall 153 provides a relatively snug fit about and in contact with at least portions of the foodstuff container outer surface. The barrier member 151 and in particular the barrier wall 153 is suitably formed of a resiliently flexible material to allow transverse expansion of the barrier wall upon insertion of the foodstuff container B into the warming compartment 163. In one suitable embodiment the barrier member 151 and in particular the barrier wall 153 is also suitably formed of a relatively thermally insulating material. For example, in one suitable embodiment the barrier member 151 and in particular the barrier wall 153 is constructed of silicone. It is understood, however, that the barrier member 151 and in particular the barrier wall 153 may be constructed of other suitable resiliently flexible materials without departing from the scope of this disclosure. It is also understood that the barrier member 151 may be constructed of a material that is not thermally insulating and remain within the scope of this disclosure.

In the illustrated embodiment, vertically extending channels 167 are formed in the inner surface 165 of the barrier wall 153 and extend substantially the entire height of the barrier wall from the lower end 157 to the upper end 155 of the barrier wall. In this manner, when the bottle B is inserted into the warming compartment 163 defined by the barrier wall 153, portions of the inner surface 165 of the barrier wall within these vertically extending channels 167 remain spaced from the bottle while other portions of the inner surface of the barrier wall remain in contact with the bottle as can be seen in FIG. 1. The channels 167 also in part facilitate the resilient expansion of the barrier wall 153 when relatively larger containers are inserted into the warming compartment 163.

Figure 2:
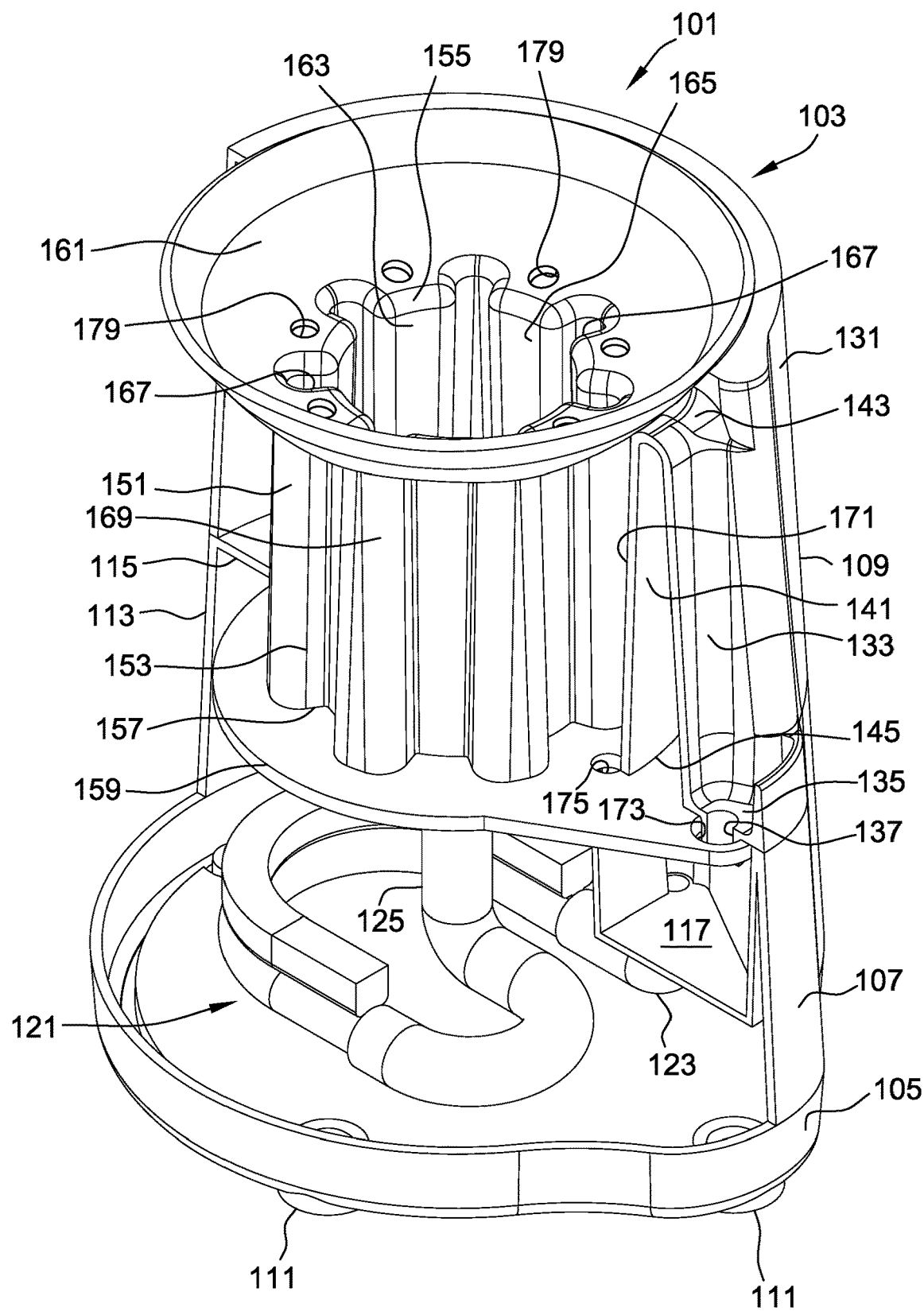
FIG. 2 is a perspective view similar to FIG. 1 with portions of the apparatus removed or sectioned to reveal internal construction.

As illustrated best in FIGS. 2-4, an outer surface 169 of the barrier wall 153 is transversely spaced from the inner peripheral sidewall 141 of the upper housing 109 to define a drain compartment 171 therebetween. The sealing gasket 159 circumscribes the lower end 157 of the barrier wall 153 and extends over the reservoir 117 (and beneath the fill tray 135 formed by the outer peripheral sidewall 131 of the upper housing 109). The sealing gasket 159 is supported by and lays flat against the support plate 115—other than where the sealing gasket extends over the reservoir 117—to form a seal between the sealing gasket and the support plate. A lower end 145 of the inner peripheral sidewall 141 sealingly engages the sealing gasket 159 to inhibit warming liquid that enters the drain compartment 171 against leaking out of the drain compartment. An opening 173 in the sealing gasket 159 is aligned with the fill opening 137 in the fill tray 135 to allow filling of the reservoir 117 via the fill opening. A drain opening 175 is disposed in the sealing gasket 159 within the drain compartment 171, e.g., transversely between the outer surface 169 of the barrier wall 153 and the inner peripheral sidewall 141, and above the reservoir 117 to permit warming liquid within the drain compartment to drain back into the reservoir. The size of the drain opening 175 may be varied and/or adjusted to obtain a desired flow rate of warming liquid back into the reservoir 117.

With reference to FIGS. 3 and 4, a thin elongate groove 177 is formed in the upper surface of the support plate 115 and extends transversely from a location within the warming compartment 163 to the reservoir 117. As a result, even though the sealing gasket 159 of the barrier member 151 seals down against the support plate 115, the groove 177 in the upper surface of the support place allows warming liquid in the warming compartment 163 to trickle from the warming compartment outward along the groove—beneath the sealing gasket 159—back to the reservoir 117 for allowing the contents of the warming compartment to drain into the reservoir upon completion of the warming operation.

The containment bowl 161 of the barrier member 151 extends outward and upward from the upper end 155 of the barrier wall 153 and terminates generally at the upper end or rim of the outer peripheral sidewall 131 of the upper housing 109. In the illustrated embodiment, the connecting panel 143 spanning the outer peripheral sidewall 131 and the inner peripheral sidewall 141 is sloped or tapered to support the bowl shaped configuration of the containment bowl 161. The containment bowl 161 is shaped in this manner to inhibit warming liquid that pools within the warming compartment 163 from overflowing the upper housing 109 of the apparatus 101. A plurality of overflow openings 179 are disposed in the containment bowl 161 in circumferentially spaced relationship with each other adjacent the upper end 155 of the barrier wall 153. For example, in the illustrated embodiment the overflow openings 179 are disposed intermittently between the vertical channels 167 formed in the barrier wall 153. The overflow openings 179 are disposed above the drain compartment 171, e.g., transversely between the outer surface 169 of the barrier wall 153 and the inner peripheral sidewall 141, to allow overflow warming liquid to drain into the drain compartment 171 for subsequent flow back to the reservoir 117 via the drain opening 175 in the sealing gasket 159. It is understood that in other embodiments the overflow openings 179 may be located further outward of the barrier wall 153 without departing from the scope of this disclosure, as long as the overflow openings open into the drain compartment 171. It is also contemplated that there may be a greater or lesser number of overflow openings 170 than as illustrated in the embodiments herein.

In operation, the reservoir 117 is filled with a suitable warming liquid, typically water, using the fill opening 137 formed in the fill tray 135 of the outer peripheral sidewall 131 of the upper housing 109. A container containing foodstuff, such as the baby bottle B illustrated in FIG. 1, is inserted down into the warming compartment 163. Upon insertion, if the cross-sectional dimension of the container B is greater than that of the warming compartment 163, the barrier wall 153 of the barrier member 151 resiliently expands to snugly receive the container. A warming operation is then initiated using a suitable control system (not shown). During the warming operation, warming liquid from the reservoir 117 flows via the delivery conduit 123 and one-way check valve therein to the heating unit 121 (e.g., the thermal heat pump in the illustrated embodiment) for heating. The heated warming liquid is delivered up through the outlet conduit 125 and through the central inlet opening 119 into the bottom of the warming compartment 163 below the container B. As the volume of heated warming liquid delivered to the warming compartment 163 increases, thus raising the level of heated warming liquid in the warming compartment, the heated warming liquid flows upward along the outer surface of the container—particularly within the vertical channels 167 formed in the inner surface 165 of the barrier wall 153. Depending on how tightly the container B fits within the warming compartment 163, the heated warming liquid may also flow along the outer surface of the container other than at the vertical channels 167.

When the level of heated warming liquid in the warming compartment 163 rises above the upper end 155 of the barrier wall 153, the warming liquid reaches the overflow openings 179 in the containment bowl 161 of the barrier member 151. The warming liquid will then flow down through the overflow openings 179 into the drain compartment 171 formed between the outer surface 169 of the barrier wall 153 and the inner peripheral sidewall 141 of the upper housing 109. Once in the drain compartment 171, the warming liquid flows from the drain compartment down through the drain opening 175 into the reservoir 117. Concurrently, warming liquid in the warming compartment 163 slowly trickles back to the reservoir 117 via the thin elongate groove 177 formed in the upper surface of the support plate 115. The warming liquid in the reservoir 117 then cycles back to the heating unit 121 for re-heating and subsequent flow back into the warming compartment 163. As such, once the level of the heated warming liquid in the warming compartment 163 reaches the overflow openings 179 of the containment bowl 161, the flow of heated warming liquid up through the warming compartment in contact with the foodstuff container B is continuous instead of stagnant. In view of the relatively snug fit of the container B within the warming compartment 163, resulting from the resiliently flexible barrier wall 153, less warming liquid is needed to fill the warming compartment with heated warming liquid in contact with the foodstuff container. Additionally, the continuous flow of heated warming liquid up through the warming compartment 163 provides a more efficient heat transfer between the warming liquid and the contents of the foodstuff container B.

Once the warming operation is completed, such as when a desired foodstuff temperature or warming time is reached, operation of the heating unit 121 (and hence the pump action of the thermal heat pump of the illustrated embodiment) ceases. This may be done automatically by the control system or manually by the person using the warming apparatus 101. Once operation ceases, heated warming liquid remaining in the drain compartment 171 continues to drain back into the reservoir 117 to inhibit further warming of the contents of the container B. Because the barrier wall 153 of the barrier member 151 is constructed of a thermally insulating material, the barrier wall 153 further insulates the contents of the foodstuff container B against further warming due to heated warming liquid in the drain compartment 171. Similarly, heated warming liquid remaining in the warming compartment 163 will continue to flow out of the warming compartment back to the reservoir 117 via the thin elongate groove 177 in the upper surface of the support plate 115. Thus, heated warming liquid is also dissipated from the warming compartment 163 to avoid further warming of the contents of the foodstuff container B.

While in the illustrated embodiment the warming apparatus 101 includes a thermal heat pump to both heat the warming liquid and deliver it into the warming compartment, it is understood that in other embodiments a separate heating unit and pump may be used without departing from the scope of this disclosure.

Figure 5:
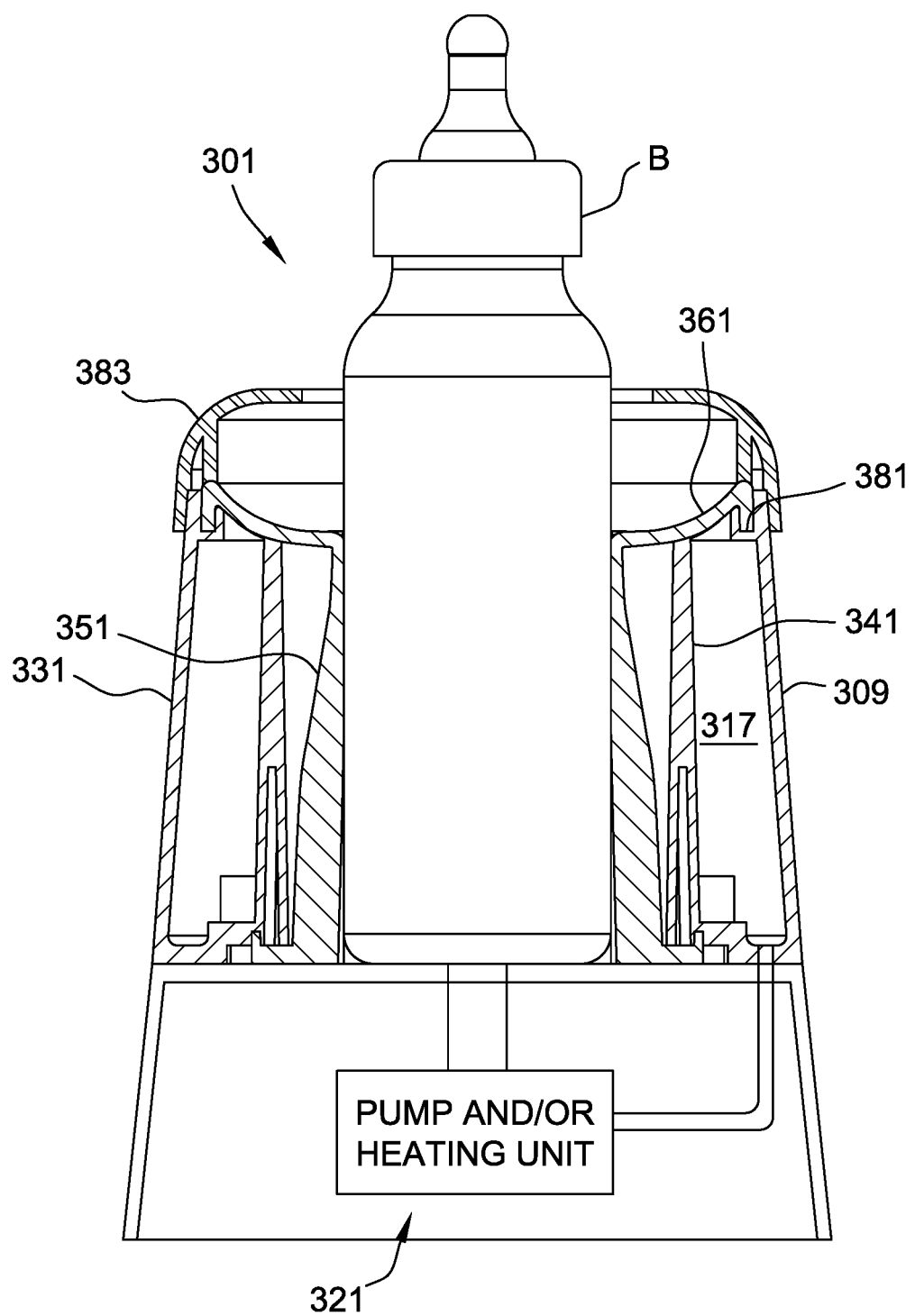
FIG. 5 is a cross-section of a second embodiment of a warming apparatus for warming the contents of a foodstuff container, with a foodstuff container to be warmed disposed in a warming compartment of the apparatus.

FIG. 5 illustrates a second embodiment of a warming apparatus 301 that is similar to the apparatus 101 of FIGS. 1-4. The warming apparatus 301 includes a heating unit 321 which may be substantially the same heating unit 121 used in the warming apparatus 101 of FIGS. 1-4. In this embodiment, however, the outer peripheral sidewall 331 of the upper housing 309 is not connected to the inner peripheral sidewall 341 of the upper housing. Rather, the containment bowl 361 of the barrier member 351 extends outward beyond and in contact with the upper end of the inner peripheral sidewall 341 and more particularly extends to and rests in a seat 381 formed at the upper end of the outer peripheral sidewall 331. A cap 383 is fitted (e.g., by friction fit, by threaded fit or other suitable technique) down over the outer peripheral sidewall 331 to retain the containment bowl 361 of the barrier member 351 in the seat 381 formed at the upper end of the outer peripheral sidewall of the upper housing 309.

Also in this embodiment, the spacing between the inner peripheral sidewall 341 and the outer peripheral sidewall 331 of the upper housing 309 defines the warming liquid reservoir 317. The overflow openings (not shown but similar to the overflow openings 179 of the embodiment of FIGS. 1-4) are located in the containment bowl 361 and are open to the reservoir 317 so that overflow warming liquid, upon reaching the overflow openings, flows directly back into the reservoir.

Figure 6:
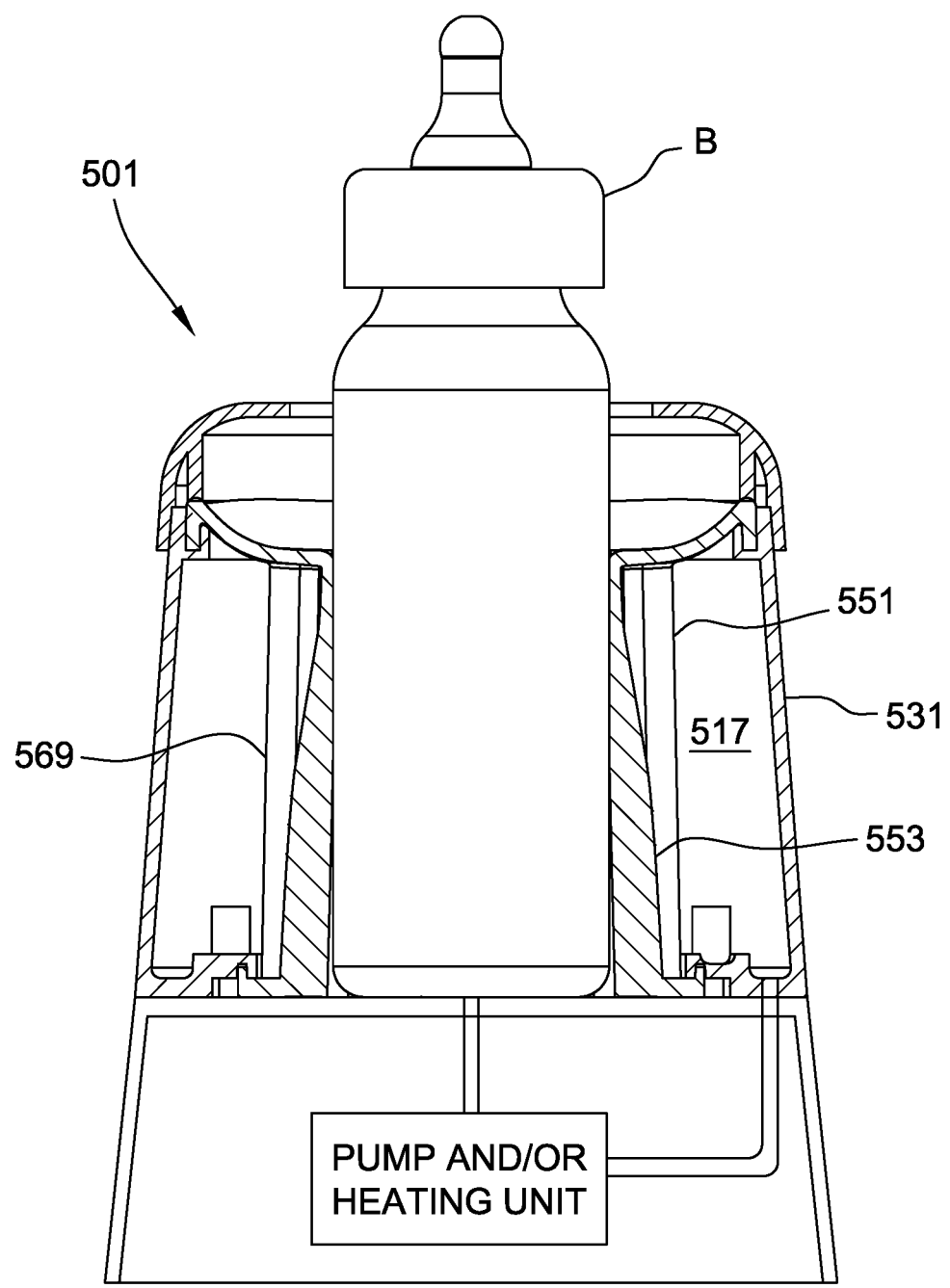
FIG. 6 is a cross-section of a third embodiment of a warming apparatus for warming the contents of a foodstuff container, with a foodstuff container to be warmed disposed in a warming compartment of the apparatus.

FIG. 6 illustrates a third embodiment of a warming apparatus 501 that is substantially similar to the warming apparatus 301 of the embodiment of FIG. 5 with the exception being that the inner peripheral sidewall 341 is omitted. Rather, the reservoir 517 is defined by the outer surface 569 of the barrier wall 553 of the barrier member 551 and the outer peripheral sidewall 531.

It is also contemplated that in some embodiments the barrier member 151, 351 may be omitted such that the warming compartment is defined by the inner peripheral side wall 141, 341 of the upper housing 109, 309.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above without departing from the scope of the disclosure, it is intended that all matter contained in the above description and shown in the accompanying drawings shall be interpreted as illustrative and not in a limiting sense.

What is claimed is:

1. Warming apparatus for warming the contents of a foodstuff container, the apparatus comprising:
    a housing having a peripheral sidewall defining an interior space of the apparatus, the housing having an open upper end;
    a barrier member disposed at least in part within the interior space of the housing, the barrier member comprising a generally tubular barrier wall extending longitudinally within the housing and defining a warming compartment therein, the barrier wall having a lower end and an open upper end accessible through the open upper end of the housing for receiving the foodstuff container into the warming compartment, the barrier wall being resiliently flexible at least transversely of the barrier member;
    a reservoir disposed in the housing for containing a warming liquid; and
    a heating unit in fluid communication with the reservoir, the heating unit being operable to receive warming liquid from the reservoir and heat the warming liquid for supplying heated warming liquid into the warming compartment and in contact with the foodstuff container to warm the contents of the foodstuff container.

2. The warming apparatus of claim 1 wherein the barrier wall has an inner surface defining the warming compartment, and a plurality of channels extending longitudinally in the inner surface from the lower end to the open upper end of the barrier wall.

3. The warming apparatus of claim 1 wherein the barrier wall is constructed of silicone.

4. The warming apparatus of claim 1 wherein the barrier wall is constructed of a thermally insulating material.

5. The warming apparatus of claim 1 wherein the barrier member has at least one overflow opening therein in fluid communication with the reservoir such that when a volume of heated warming liquid in the warming compartment rises to a height of the at least one overflow opening, the heated warming liquid will drain through the at least one overflow and back to the reservoir.

6. The warming apparatus of claim 5 wherein the housing further defines a drain compartment within the interior space of the housing exterior of the barrier wall and separate from the reservoir, the at least one overflow opening being open to the drain compartment such that when a volume of heated warming liquid in the warming compartment rises to a height of the at least one overflow opening, the heated warming liquid will drain through the at least one overflow opening into the drain compartment, the drain compartment being in fluid communication with the reservoir such that warming liquid in the drain compartment flows back into the reservoir.

7. The warming apparatus of claim 5 further comprising a flow path extending from within the warming compartment at the lower end of the barrier wall to the reservoir such that heated liquid within the warming compartment continuously drains from the warming compartment back to the reservoir.

8. The warming apparatus of claim 1 wherein the heating unit is a thermal heat pump.

9. The warming apparatus of claim 8 wherein the heated warming liquid is delivered by the thermal heat pump into the warming compartment at the lower end of the barrier wall.

10. Warming apparatus for warming the contents of a foodstuff container, the apparatus comprising:
    a housing having a peripheral sidewall defining an interior space of the apparatus, the housing having an open upper end;
    a barrier member disposed at least in part within the interior space of the housing, the barrier member comprising a generally tubular barrier wall extending longitudinally within the housing and defining a warming compartment therein, the barrier wall having a lower end and an open upper end accessible through the open upper end of the housing for receiving the foodstuff container into the warming compartment, the barrier wall being constructed of a resiliently flexible material and adapted to engage the foodstuff container when the foodstuff container is disposed in the apparatus;
    a reservoir disposed in the housing for containing a warming liquid; and
    a heating unit in fluid communication with the reservoir, the heating unit being operable to receive warming liquid from the reservoir and heat the warming liquid for supplying heated warming liquid into the warming compartment and in contact with the foodstuff container to warm the contents of the foodstuff container.

11. The warming apparatus of claim 10 wherein the barrier wall has an inner surface defining the warming compartment, and a plurality of channels extending longitudinally in the inner surface from the lower end to the open upper end of the barrier wall.

12. The warming apparatus of claim 10 wherein the barrier member has at least one overflow opening therein in fluid communication with the reservoir such that when a volume of heated warming liquid in the warming compartment rises to a height of the at least one overflow opening, the heated warming liquid will drain through the at least one overflow and back to the reservoir.

13. The warming apparatus of claim 12 wherein the housing further defines a drain compartment within the interior space of the housing exterior of the barrier wall and separate from the reservoir, the at least one overflow opening being open to the drain compartment such that when a volume of heated warming liquid in the warming compartment rises to a height of the at least one overflow opening, the heated warming liquid will drain through the at least one overflow opening into the drain compartment, the drain compartment being in fluid communication with the reservoir such that warming liquid in the drain compartment flows back into the reservoir.

14. The warming apparatus of claim 12 further comprising a flow path extending from within the warming compartment at the lower end of the barrier wall to the reservoir such that heated liquid within the warming compartment continuously drains from the warming compartment back to the reservoir.

15. The warming apparatus of claim 10 wherein the heating unit is a thermal heat pump.

16. The warming apparatus of claim 15 wherein the heated warming liquid is delivered by the thermal heat pump into the warming compartment at the lower end of the barrier wall.

17. A barrier member for use in a warming apparatus for warming the contents of a foodstuff container, the barrier member comprising:
- a generally tubular barrier wall extending longitudinally within a housing interior and defining a warming compartment therein, the barrier wall having a lower end and an open upper end accessible through an open upper end of the housing for receiving the foodstuff container into the warming compartment, the barrier wall being resiliently flexible at least transversely of the barrier member, the barrier wall having an inner surface defining the warming compartment, and a plurality of channels extending longitudinally in the inner surface from the lower end to the upper end of the barrier wall;
- a sealing gasket extending transversely outward from the lower end of the barrier wall; and
- a containment bowl extending generally transversely outward and upward from the upper end of the barrier wall in a generally bowl-shaped configuration.

18. The barrier member of claim 17 wherein the containment bowl comprises at least one overflow opening operable to be in fluid communication with a reservoir.

19. The barrier member of claim 17 wherein a drain opening is disposed in the sealing gasket at an outwardly transverse distance from the lower end of the barrier wall and operable to be in fluid communication with a reservoir.

20. The barrier member of claim 17 wherein the barrier member is constructed of a thermally insulating material.

* * * * *